United States Patent
Lee et al.

(10) Patent No.: US 7,026,590 B2
(45) Date of Patent: Apr. 11, 2006

(54) LOW-OUTPUT MICROWAVE, LIGHTING SYSTEM AND FLICKER REMOVING METHOD USING THE SAME

(75) Inventors: Ji-Young Lee, Gyeonggi-Do (KR); Yong-Seog Jeon, Gyeonggi-Do (KR); Hyun-Jung Kim, Seoul (KR); Joon-Sik Choi, Seoul (KR); Yun-Chul Jung, Gyeonggi-Do (KR); Byeong-Ju Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/750,847

(22) Filed: Jan. 5, 2004

(65) Prior Publication Data

US 2005/0067972 A1 Mar. 31, 2005

(30) Foreign Application Priority Data

Sep. 25, 2003 (KR) ............... 2003-66647

(51) Int. Cl.
*H05B 6/66* (2006.01)
*H01J 25/50* (2006.01)

(52) U.S. Cl. .............. 219/715; 219/716; 219/718; 315/39.51

(58) Field of Classification Search ........ 219/715, 219/716, 718, 702, 721, 482, 483, 488–490; 315/247, 246, 276, 282, 291, 297, 307, 209 R, 315/39.51; 363/89, 95, 80–81
See application file for complete search history.

(56) References Cited

U.S. PATENT DOCUMENTS

| | | | | |
|---|---|---|---|---|
| 4,593,167 A * | 6/1986 | Nilssen | ............... | 219/716 |
| 5,250,775 A * | 10/1993 | Maehara et al. | ............ | 219/771 |
| 5,371,440 A * | 12/1994 | Liu et al. | ............... | 315/209 R |
| 5,444,333 A | 8/1995 | Lau | ............... | 315/94 |
| 6,222,746 B1 * | 4/2001 | Kim | ............... | 363/89 |
| 6,335,520 B1 * | 1/2002 | Lee et al. | ............... | 219/716 |
| 6,433,321 B1 * | 8/2002 | Lee et al. | ............... | 219/715 |

FOREIGN PATENT DOCUMENTS

| EP | 0474315 A2 | | 3/1992 |
|---|---|---|---|
| EP | 0583841 A2 | | 2/1994 |
| SE | WO 98/11655 | * | 3/1998 |

* cited by examiner

*Primary Examiner*—Tuyet Thi Vo
(74) *Attorney, Agent, or Firm*—Fleshner & Kim, LLP

(57) ABSTRACT

A low-output microwave lighting system includes: a rectifier for rectifying general AC power inputted through a power source unit and outputting a DC voltage; a power factor compensator for compensating a power factor of the DC voltage inputted through the rectifier; and an inverter circuit unit for receiving the power factor-compensated DC voltage and outputting an AC voltage through frequency varying. 120 Hz of ripple generated at a low output can be reduce, and it is driven at a frequency of 20 KHz or higher, so that a flicker phenomenon does not occur and a volume and weight in facility can be reduced.

8 Claims, 5 Drawing Sheets

ENLARGEMENT OF TIME AXIS

LOW-OUTPUT MICROWAVE, LIGHTING SYSTEM AND FLICKER REMOVING METHOD USING THE SAME

BACKGROUND OF THE INVENTION

1. Field of the Invention

The present invention relates to a microwave lighting system and, more particularly, to a low-output microwave lighting system capable of enhancing a stability of a system by removing a flicker phenomenon generated at a low output and a flicker removing method using the same.

2. Description of the Background Art

Recently, a lighting system using microwave has been developed and is increasingly used thanks to its long life span and good luminance characteristics.

FIG. 1 is a schematic block diagram showing a construction of a conventional lighting system using microwave.

As shown in FIG. 1, a lighting system using microwave includes: a magnetron 10 generating microwave; a resonator 30 having an electrodeless bulb therein, resonating microwave supplied from the magnetron 10, and having a mesh form so that when the bulb converts microwave energy into light, the converted light can be discharged outwardly to its maximum; a wave guide 40 for guiding microwave generated from the magnetron 10 to the resonator 30; a high level voltage generator 50 for receiving power from an external source, boosting it to a high level voltage and supplying the high level voltage to the magnetron 10; a cooling unit 70 for cooling the magnetron 10 and the high level voltage generator 50 in order to prevent overheat of them due to a self-generated heat; a controller 60 for controlling the high level voltage generator 50 which applies the high level voltage to the magnetron and controlling an operation of the cooling unit 70; and a cooling completion memory unit 80 for memorizing whether cooling has been completed.

The operation of the conventional lighting system using microwave constructed as described above will now be explained.

First, the high level voltage generator 50 receives a drive signal outputted from the controller 60, increases AC power inputted from an external source, and supplies AC power of the increased high level voltage to the magnetron 10.

Thereafter, the magnetron 10 is oscillated by the high level voltage outputted from the high level voltage generator 50 and concentrates microwave with a very high frequency to the electrodeless bulb 20 in the resonator 30 through the wave guide 40. Accordingly, the electrodeless bulb 20 absorbs the microwave energy to generate light. At this time, when the high level voltage generator 50 is driven, the controller 60 drives the cooling unit 70 to cool the high level voltage generator 50, the magnetron 10 and the electrodeless bulb 20, in order to prevent the high level voltage generator 50 and the magnetron 10 from being overheated due to self-heating.

In order to actuate the lamp in an OFF state, the electrodeless bulb 20 should be sufficiently cooled for re-lighting the lamp. Thus, after the lamp is turned off, the cooling unit 70 is operated for a predetermined time to sufficiently cool the electrodeless bulb 20, a cooling completion state is recorded in the cooling completion memory unit 80, and then, the driving of the cooling unit 70 is stopped.

Thereafter, when the lamp is re-actuated, the controller 60 reads the content of the cooling completion memory unit 80, and if the cooling has been completed, the controller 60 re-actuates the lamp, or otherwise, the controller drives the cooling unit 70 for a predetermined time, and then, re-actuates the lamp.

The afore-mentioned microwave lighting system uses a linear high level voltage transformer in order to drive the magnetron.

FIG. 2 is a circuit diagram of the high level voltage generator using the linear high level voltage transformer in accordance with the conventional art, and FIG. 3 is an exemplary view showing an output waveform of the conventional microwave lighting system.

As shown in FIG. 2, in the conventional microwave lighting system, the electrodeless bulb is lighted by a secondary voltage generated by a voltage applied to a primary side of the linear high level voltage transformer. However, if the general AC power is increased to above a predetermined voltage, a power factor is degraded to increase a noise and a load of a circuit, resulting in degradation of stability of a system.

That is, as shown in FIG. 3, when a low-output lamp is lighted with a 120 Hz sinusoidal low-frequency input current in a state of plasma in a discharge tube, an instantaneous value of the lamp power is periodically changed, so that a temperature change in the discharge tube waves, generating a flicker phenomenon that a light source flickers. Then, a life span of the light system is shortened, a ripple is generated to cause an unstable lighting and degrade an efficiency of the lighting system. In addition, since the linear high level voltage transformer is large in volume and heavy in weight, a cost in construction of a facility (that is the lighting system) is increased.

SUMMARY OF THE INVENTION

Therefore, an object of the present invention is to provide a low-output microwave lighting system capable of enhancing a stability of a system by removing a flicker phenomenon generated at a low output by using a power factor compensation circuit and an inverter-purpose transformer, and a flicker removing method using the same.

To achieve these and other advantages and in accordance with the purpose of the present invention, as embodied and broadly described herein, there is provided a low-output microwave lighting system including: a rectifier for rectifying general AC power inputted through a power source unit and outputting a DC voltage; a power factor compensator for compensating a power factor of the DC voltage inputted through the rectifier; and an inverter circuit unit for receiving the power factor-compensated DC voltage and outputting an AC voltage through frequency varying.

To achieve the above objects, there is also provided a flicker removing method using a low-noise microwave lighting system, including: rectifying general AC power and outputting a DC voltage; increasing the DC voltage through a PFC circuit for improvement of a power factor to reduce a ripple; receiving the DC voltage, varying a frequency of the DC voltage through a half-bridge, and outputting an AC voltage; and receiving the AC voltage and driving a magnetron.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
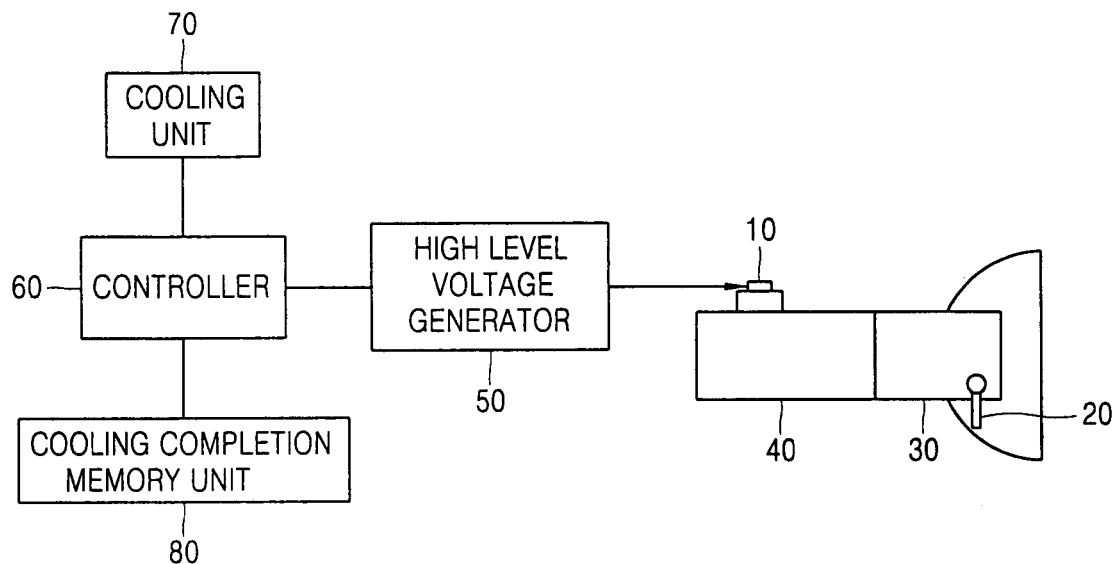
FIG. 1 is a schematic block diagram showing a construction of a lighting system using microwave in accordance with a conventional art.
Figure 2:
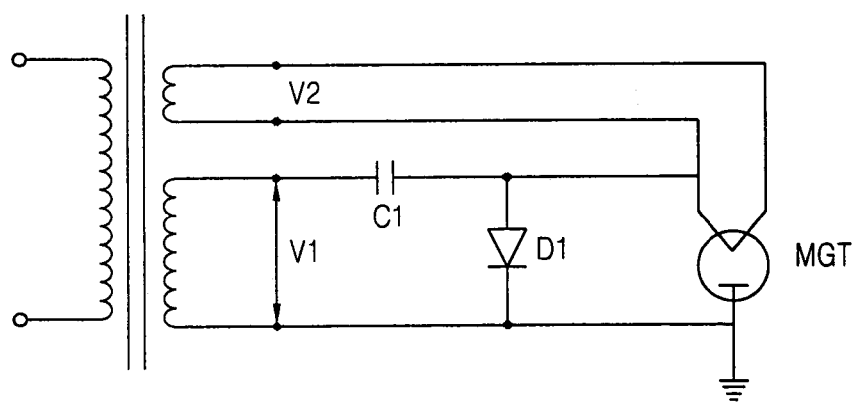
FIG. 2 is a circuit diagram of a high level voltage generator using a linear high level voltage transformer in accordance with the conventional art.
Figure 3:
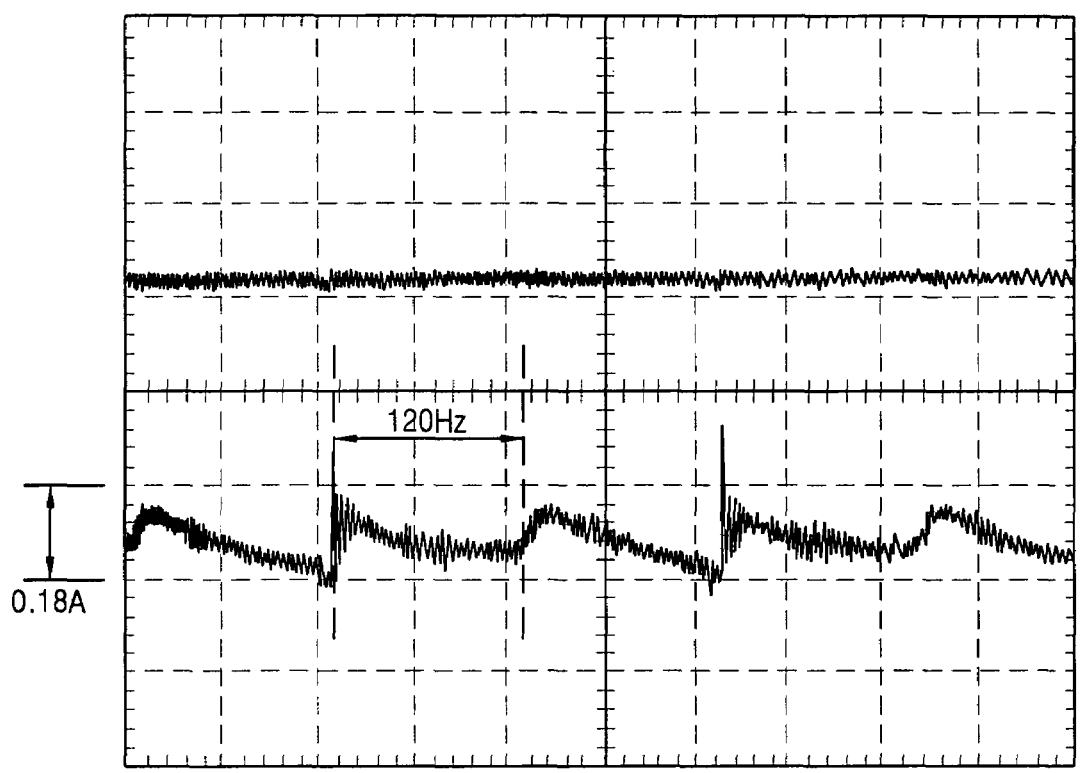
FIG. 3 is an exemplary view showing an output waveform of the conventional microwave lighting system.
Figure 4:
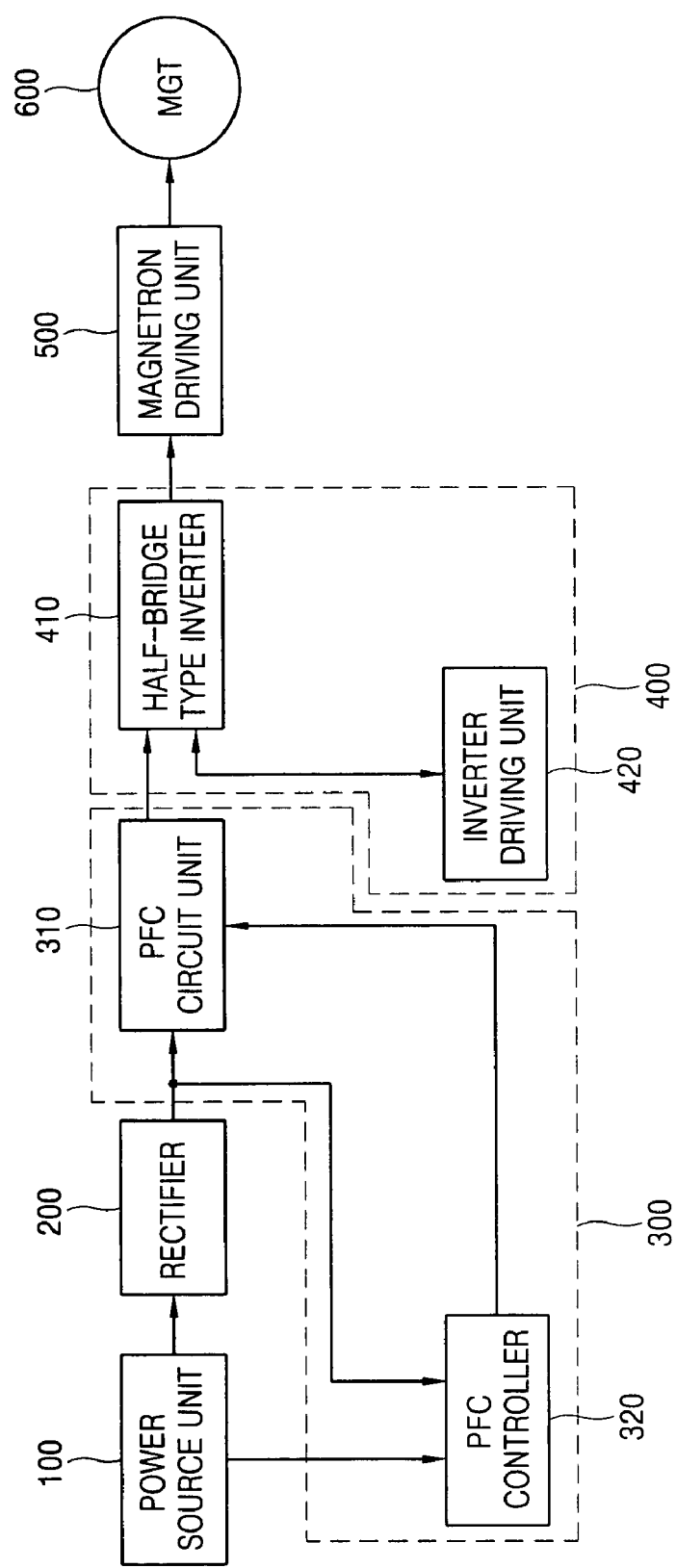
FIG. 4 is a block diagram showing a construction of a microwave lighting system in accordance with the present invention.

FIG. 4 is a block diagram showing a construction of a microwave lighting system in accordance with the present invention.

As shown in FIG. 4, a low-output microwave lighting system of the present invention includes: a rectifier 200 for rectifying general AC power inputted through a power source unit 100 and outputting a DC voltage; a power factor compensator 300 for compensating a power factor of the DC voltage inputted through the rectifier 200; an inverter circuit unit 410 for receiving the power factor-compensated DC voltage and outputting an AC voltage through frequency varying; a magnetron driving unit 500 for transforming the AC voltage inputted from the inverter circuit unit 410 and generating a magnetron filament current and a high level voltage; and a magnetron 600 lighted by the high level voltage and current outputted from the magnetron driving unit 500.

The power factor compensator 300 includes a PFC controller 320 for outputting a control signal for a power factor compensation by the rectified signal inputted through the rectifier 200; and a PFC circuit unit 310 for compensating the power factor of the DC voltage inputted through the rectifier 200 upon receiving the control signal.

The inverter circuit unit 400 includes a half-bridge type inverter 410 for receiving the DC voltage outputted from the power factor compensator 300, varying its frequency, and outputting a corresponding AC voltage; and an inverter driving unit 420 for outputting a switching control signal to control switching of the half-bridge type inverter 410.

Figure 5:
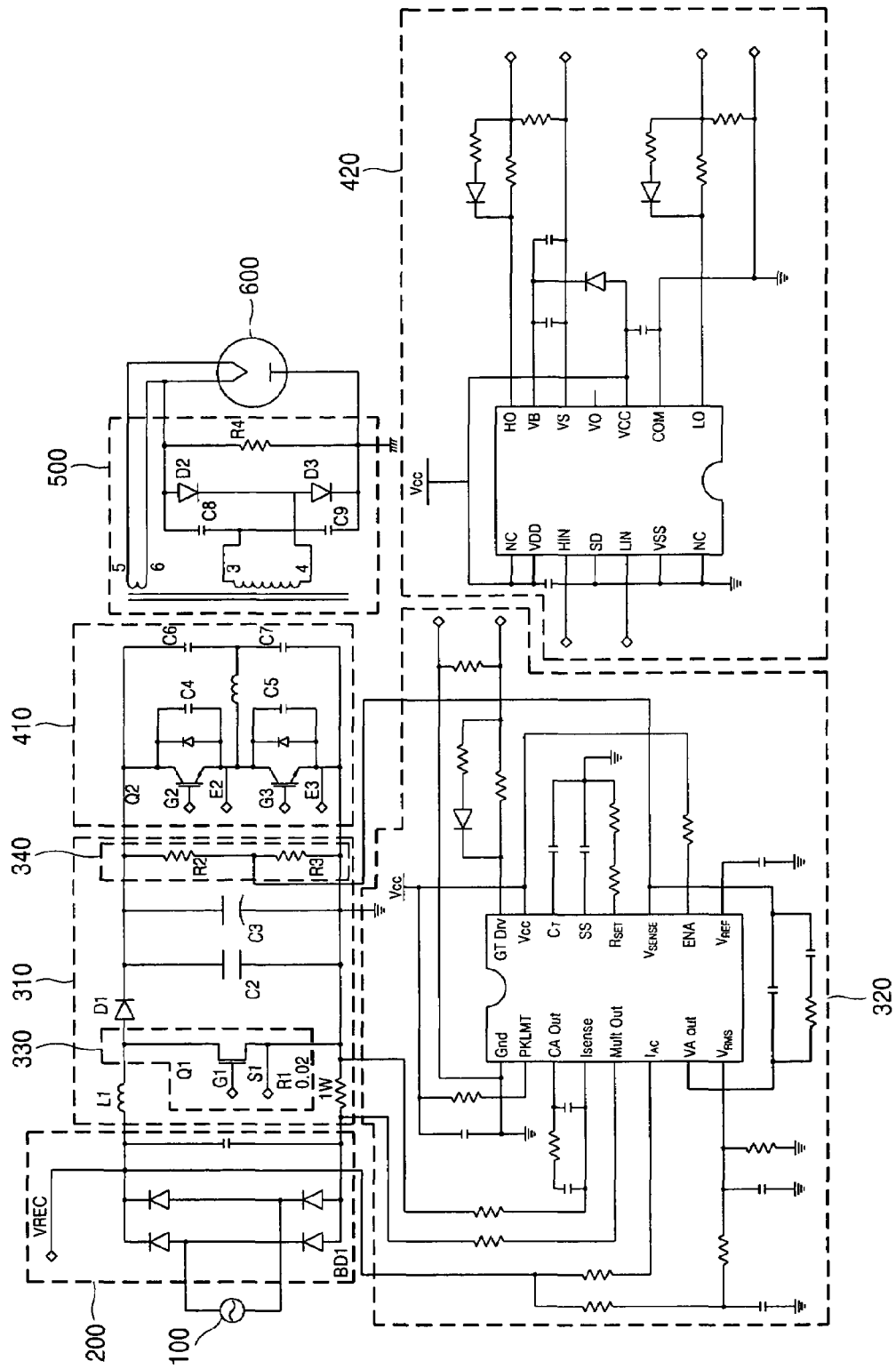
FIG. 5 is a circuit diagram of the microwave lighting system in accordance with the present invention.

FIG. 5 is a circuit diagram of the microwave lighting system in accordance with the present invention.

The construction of the microwave lighting system including the power factor compensator 300 and the inverter circuit unit 400 will now be described with reference to FIG. 5.

First, the power factor compensator 300 includes a coil L1, a rectifying diode D1 and a smoothing condenser C2 for converting the rectified DC voltage into a PFC output voltage; a feedback detector 340 for distributing the PFC output voltage to two resistances R2 and R3 and outputting a feedback voltage; a PFC controller 320 for receiving the feedback voltage from a contact point of the two resistances R2 and R3 and outputting a control signal for adjusting a power factor of the PFC output voltage; and a MISFET unit 330 having a gate terminal for receiving the control signal outputted from the PFC controller 320 and performing ON/OFF, and a drain terminal connected to a contact point of the coil L1 and the rectifying diode D1.

If the circuit is constructed such that a feedback voltage is set to be different according to the inputted DC voltage, a different control signal can be applied to the MOSFET unit according the PFC controller. Accordingly, the power factor compensator 310 can output various PFC output voltages.

The inverter circuit unit 400 includes the half-bridge type inverter 410 having two MOSFETs each having a diode between a drain and a source; and an inverter driving unit 420 for outputting a switching control signal for controlling switching of the half-bridge type inverter unit 410.

The half-bridge type inverter 410 includes two MOSFETs, that is, the switching units, of Q2 and Q3, and in this respect, since the diode is inserted between the drain and the source of the MOSFET, there are four power semiconductor switches. Accordingly, a form of an AC output voltage is determined according to a control method of Q2 and Q3 of the MOSFET.

The operation of the microwave lighting system constructed as described above will now be explained in detail.

First, the rectifier 200 rectifies general AC power inputted through the power source unit 100 and applies a corresponding DC voltage to the PFC circuit unit 310.

The rectified DC voltage is applied to the MOSFET unit 330 and the rectifying diode D1 through the coil L1 of the PFC circuit unit 310. Accordingly, output power of the rectifying diode D1 is smoothed by the smoothing condenser C2 and converted into a DC output voltage (Vout), that is, a PFC output voltage. Herein, the PFC controller 320 applies a control signal for compensating a power factor of the DC voltage by the rectified signal inputted through the rectifier 200, to the MOSFET unit 330 of the PFC circuit unit 310.

Accordingly, if the MOSFET unit 330 is in an ON state, the energy of the input DC voltage is accumulated at the coil L1, whereas if the MOSFET unit 4 is in an OFF state, the energy accumulated at the coil L1 overlaps with the input DC voltage, rectified by the rectifying diode D1 and outputted as a DC output voltage by the smoothing condenser C2. Thus, a higher level DC output voltage than the input DC voltage can be obtained.

Thereafter, the PFC circuit unit 310 applies a power factor-compensated high level DC output voltage to the half-bridge type inverter 410.

Upon receiving the DC voltage from the PFC circuit unit 310, the half-bridge type inverter 410 varies its frequency and a corresponding AC voltage. That is, in order to supply a waveform obtained by adding a sinusoidal high frequency component of a high frequency band to a square wave low frequency, to the lamp, the half-bridge type inverter 410 generates an AC output voltage from the PFC output voltage by a switching control signal of the inverter driving unit 420, and supplies it to the magnetron driving unit 500.

In addition, by using an LCC resonating network, the half-bridge type inverter shares the role of coupling and resonating or a role before and after lighting, and is driven at a frequency of 20 KHz or higher to remove a ripple.

Figure 6:
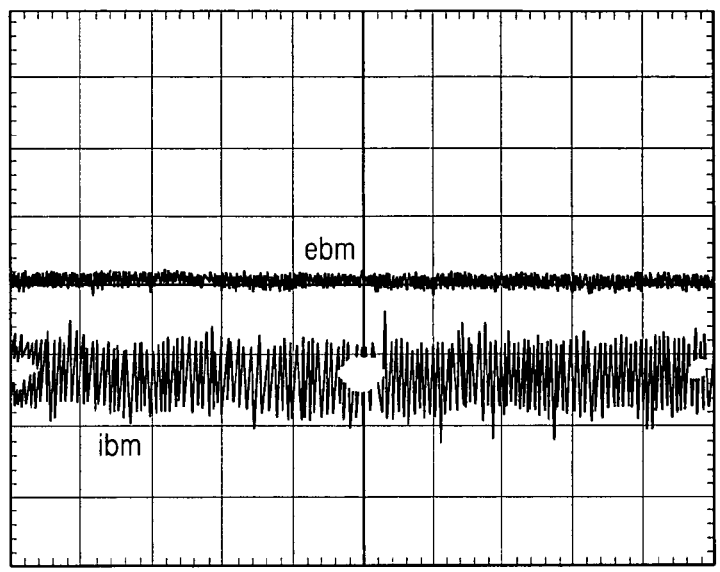
FIG. 6 is an exemplary view showing an output waveform of a driving unit of the microwave lighting system in accordance with the present invention.
Figure 6:
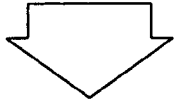
Figure 6:
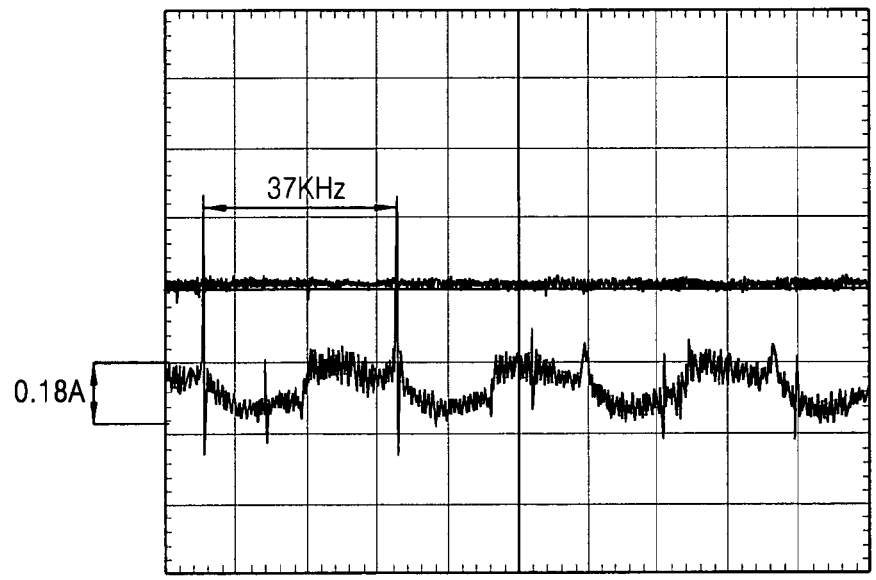

Finally, the magnetron driving unit 500 transforms the AC voltage inputted from the half-bridge type inverter 410 and applies a secondary magnetron filament current and a high level voltage to the magnetron (MGT) 600 to light the lamp. At this time, as shown in FIG. 6, an output value of the driving unit of the microwave lighting system has a considerably reduced ripple compared to that of the conventional art, so that a high level voltage is generated.

To sum up, when the waveform obtained by adding the sinusoidal high frequency component of a high frequency band to the square wave low frequency is applied to the lamp, a temperature becomes constant thanks to a skin effect, making a pressure in the discharge tube constant. Thus, no flicker phenomenon occurs, so an efficiency of the lamp is heightened and a life span of the lamp can be lengthened.

As so far described, the low-output microwave lighting system of the present invention has the following advantages.

That is, for example, first, a 120 Hz ripple can be reduced by using the PFC circuit, and since the microwave lighting system is driven at a frequency of 20 KHz or higher by using the half-bridge inverter, the flicker phenomenon does not occur.

In addition, because the PFC circuit using the semiconductor device and the half-bridge circuit are used, its volume and weight can be reduced compared to use of the conventional linear high level voltage transformer.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A low-output microwave lighting system comprising:
    a rectifier for rectifying general AC power inputted through a power source unit and outputting a DC voltage;
    a power factor compensator for compensating a power factor of the DC voltage inputted through the rectifier;
    an inverter circuit unit for receiving the power factor-compensated DC voltage and outputting an AC voltage through frequency varying;
    a magnetron driving unit for transforming the AC voltage inputted from the inverter circuit unit and generating a magnetron filament current and a high level voltage; and
    a magnetron lighted by the high level voltage and current outputted from the magnetron driving unit, wherein the power factor compensator comprises,
        a PFC controller for outputting a controlling a power factor compensation by a rectified signal inputted through the rectifier, and
        a PFC circuit unit for receiving the control signal and compensating a power factor of the DC voltage inputted through the rectifier.

2. The system of claim 1, wherein the inverter circuit unit comprises:
    a half-bridge type inverter unit for receiving the DC voltage outputted from the power factor compensator, varying a frequency of the DC voltage, and outputting a corresponding AC voltage; and
    an inverter driving unit for outputting a switching control signal for controlling switching of the half-bridge type inverter unit.

3. The system of claim 1, wherein the power factor compensator comprises:
    a coil, rectifying diode and smoothing condenser for converting the rectified DC voltage into a PFC output voltage;
    a feedback detector for distributing the PFC output voltage to two resistances and outputting a feedback voltage;
    a PFC controller for receiving the feedback voltage from a connection point of the two resistances, and outputting a control signal for adjusting a power factor of the PFC output voltage; and
    a MOSFET unit for receiving the control signal outputted from the PFC controller by a gate and performing ON/OFF.

4. The system of claim 1, wherein the inverter circuit unit includes a half-bridge type inverter which has two MOSFETs and a diode is inserted between a drain and a source of the MOSFET.

5. The system of claim 1, wherein the inverter circuit unit is driven at a predetermined frequency, preferably, at a frequency of 20 KHz or higher.

6. A flicker removing method using a low-noise microwave lighting system, comprising:
    a) rectifying general AC power and outputting a DC voltage;
    b) increasing the DC voltage through a PFC circuit for improvement of a power factor to reduce a ripple;
    c) receiving the DC voltage, varying a frequency of the DC voltage through a half-bridge, and outputting an AC voltage; and
    d) receiving the AC voltage and driving a magnetron, wherein the step b) comprises,
        converting the rectified DC voltage into the PFC output voltage,
        distributing the PFC output voltage to two resistances and outputting a feedback voltage,
        receiving the feedback voltage and outputting a control signal for adjusting the power factor of the PFC output voltage, and
        receiving the control signal for adjusting the power factor of the PFC output voltage and performing ON/OFF.

7. The method of claim 6, wherein 120 Hz of ripple is reduced by using the PFC circuit, and the microwave light system is driven at a frequency of 20 KHz or higher by using the half-bridge inverter.

8. The method of claim 6, wherein the waveform inputted to the magnetron is a waveform in which a sinusoidal high frequency component of a high frequency band has been added to a square wave low frequency.

* * * * *